(12) United States Patent
Anderson

(10) Patent No.: US 6,430,118 B1
(45) Date of Patent: Aug. 6, 2002

(54) DATA STORAGE UTILIZING PARITY DATA TO ENHANCE PERFORMANCE

(75) Inventor: Michael H. Anderson, Westlake Village, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/376,780

(22) Filed: Aug. 18, 1999

(Under 37 CFR 1.47)

(51) Int. Cl.[7] ............................ G11B 21/08; G06F 12/00
(52) U.S. Cl. ........................ 369/30.1; 711/111; 711/112
(58) Field of Search ............................ 369/30.06, 30.1, 369/30.2, 30.15, 30.33, 30.34, 30.88; 360/72.1, 78.14; 711/111, 112, 113, 114, 115, 117, 134, 136, 133, 161–163, 165; 710/1, 7, 10, 5, 15–23

(56) References Cited

U.S. PATENT DOCUMENTS

| | | | |
|---|---|---|---|
| 5,237,689 A | * | 8/1993 | Behnke ........................ 710/10 |
| 5,386,402 A | * | 1/1995 | Iwata ........................ 369/30.1 |
| 5,805,979 A | * | 9/1998 | Anderson ........................ 710/1 |
| 5,893,139 A | * | 4/1999 | Kamiyama ................... 711/113 |
| 5,933,840 A | * | 8/1999 | Menon et al. .............. 707/205 |
| 6,108,748 A | * | 8/2000 | Ofek et al. .................. 711/100 |
| 6,112,255 A | * | 8/2000 | Dunn et al. .................... 710/52 |
| 6,151,641 A | * | 11/2000 | Herbert ........................ 710/22 |
| 6,275,898 B1 | * | 8/2001 | DeKoning .................. 711/114 |
| 6,341,317 B1 | * | 1/2002 | D'Errico et al. ............ 710/111 |

\* cited by examiner

Primary Examiner—Thang V. Tran
(74) Attorney, Agent, or Firm—Blakely, Sokoloff, Taylor & Zafman LLP

(57) ABSTRACT

A multiple storage-device data storage system that utilizes parity data to enhance performance. In one embodiment, the system signals the availability of a needed segment of user data after all but one of its sub-segments become available. In another embodiment, the system Predicts which sub-segment is likely to take the longest to retrieve and never issues a command for the retrieval of that sub-segment.

18 Claims, 5 Drawing Sheets

DATA STORAGE UTILIZING PARITY DATA TO ENHANCE PERFORMANCE

BACKGROUND OF THE INVENTION

1. Field of the Invention

This invention relates to data storage devices and, more particularly, to data storage devices in which each segment of data is divided into one or more data sub-segments and a parity sub segment and in which each sub-segment is stored on a separate storage device.

2. Description of Related Art

User data, such as a video stream, is often divided into segments, each segment containing a portion of the user data.

In turn, each segment is often divided into one or more data sub-segments and a parity sub-segment. Each data sub-segment contains a portion of the user data contained in the segment. The parity sub-segment contains information necessary for recreating an unavailable data sub-segment in conjunction with the available data sub-segments.

Each of the sub-segments that comprise a particular segment of user data (i.e., the data sub-segments and the parity sub-segment) are typically stored on a separate storage device, and all of the storage devices operate under a common control. One such configuration is known as a RAID, the acronym standing for a redundant array of inexpensive drives.

A RAID has several advantages. By breaking a segment of user data into a plurality of sub-segments and by simultaneously reading or writing those sub-segments, the speed at which the segment of data can be read or written is effectively multiplied by the number of separate storage devices. If a storage device containing a data sub-segment malfunctions during a read operation, the corresponding parity segment contained on another storage device, in conjunction with the available data sub-segments can advantageously be used to recreate the data sub-segment that was stored on the malfunctioning drive. To further enhances performance, the parity sub-segments are often stored on different storage devices.

Increasing the rate at which data can be read from a RAID continues to be of growing importance. Unfortunately, it also continues to be of great difficulty due to the intrinsic nature of the storage devices.

These storage devices are typically hard disk drives. When data residing in a particular track is desired, the head is moved over that track and must wait for the disk to rotate until the beginning of the sector containing the desired data arrives underneath the head. These delays are known as skew and latency delays.

Other delays are sometimes caused by multiple storage devices attempting to simultaneously access a common bus. These delays are known as bus contention delays.

The effect of these delays is often cumulative. Moreover, the drive array controller typically waits until all of the storage devices report the availability of their requested sub-segments before signaling the computer that the desired data segment is available. Since the cumulative delays of each storage device are typically different, the controller is usually unable to signal the availability of the desired data segment until very slowest of all of the storage devices is ready. Average access time is thus reduced, particularly when each data segment is subdivided into a large number of sub-segments.

SUMMARY OF THE INVENTION

The invention utilizes parity data to enhance performance in a data storage system.

In one embodiment of the invention, a plurality of storage devices are used to store the data sub-segments and the parity sub-segment. Each storage device is configured to store one of the sub-segments of each segment. Each storage device also has an input for receiving a request for a sub-segment stored on the device and an output that indicates when a requested sub-segment is available for delivery from the storage device;.

A controller is connected to the inputs of the storage devices for causing each of the devices to begin accessing the sub-segment stored on the device that corresponds to a desired segment of the user data, in response to a request for that segment.

A data ready generator is also provided that is connected to the outputs of the storage devices. The generator indicates when all but one of the outputs indicate that the requested sub-segment stored on the device is available for delivery.

With this embodiment, the needed data segment becomes available, even before the storage device that is taking the most time to access its respective sub-segment has succeeded. If the slowest storage device contains a data sub-segment, that data sub-segment is recreated from the parity sub-segment and the other data sub-segments that are currently available.

In an alternate embodiment of the invention, the identity of the slowest drive is predicted before any of the drives are instructed to seek their respective sub-segments. In this embodiment, the predicted slowest drive is never instructed in the first instance to seek its respective sub-segment. In this embodiment, the predicted slowest drive is freed up even sooner, further enhancing average performance.

These as well as still further features and benefits of the present invention will now become clear from the following description of the preferred embodiments, taken in conjunction with the accompanying drawings.

DESCRIPTION OF THE PREFERRED EMBODIMENT(S)

Figure 1:
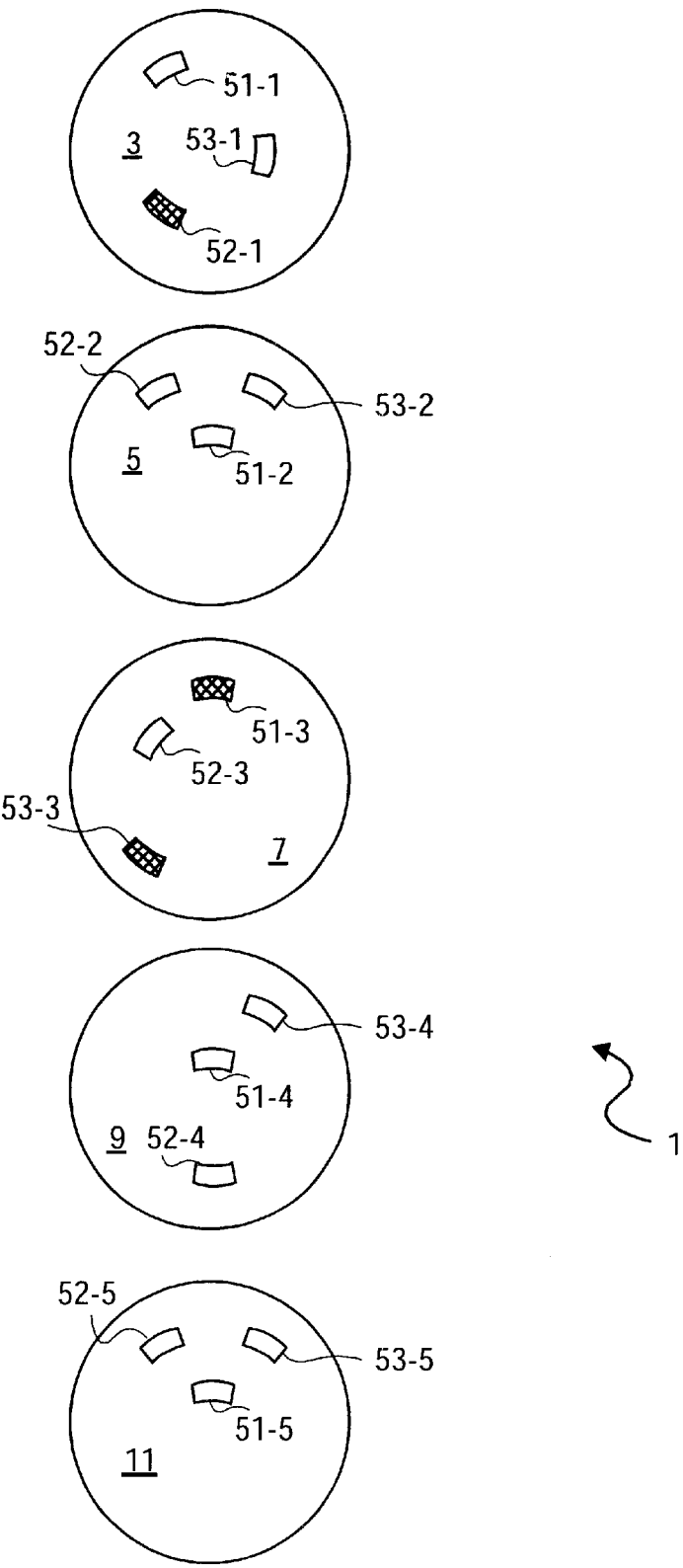
FIG. 1 is an illustration of the storage layout of a typical prior art RAID system.

FIG. 1 is an illustration of the storage layout of a typical prior art RAID system.

As shown in FIG. 1, a typical prior art RAID system 1 includes a plurality of hard disk drives, such as hard disk drives 3, 5, 7, 9, and 11.

The user data, such as a video stream, which is to be stored on the RAID system 1 is typically divided into a plurality of segments. Each segment, in turn, is divided into one or more data sub-segments and a parity sub-segment.

The sub-segments comprising three of these segments are illustrated in FIG. 1 The first segment is illustrated by sub-segments S1-1, S1-2, S1-3, S1-4 and S1-5. The second segment is illustrated by sub-segments S2-1, S2-2, S2-3, S2-4 and S2-5. The third segment is illustrated by sub-segments S3-1, S3-2, S3-3, S3-4 and S3-5.

As illustrated in FIG. 1, each sub-segment that comprises a particular segment is stored on a separate storage device. This is typical in a RAID system. Although the sub-segments can be stored in the same location of each storage device, they often are not, as also illustrated in FIG. 1.

As indicated, each set of sub-segments include a parity sub-segment. These are illustrated in FIG. 1 by the blackened segments S1-3, S2-1 and S3-3. In some RAID systems, a single storage device is dedicated to the storage of all of the parity sub-segments. In other RAID systems, the parity sub-segments are stored on some or all of the storage devices. An example of this later configuration is illustrated in FIG. 1. The, invention is applicable to both.

When a typical RAID system operates, a controller is usually used to receive requests for needed data segments and to fulfill those requests. In response to each request for a data segment, the controller typically issues requests to all of the storage devices in the RAID system for the sub-segments that comprise the needed data segment. This typically includes the drive that is storing the parity sub-segment.

As is well known in the art, there will be a delay before each sub-segment becomes available. There are many factors which contribute to this delay, including the time it takes the head on the storage device to move over the needed track, the time it takes the disk to rotate so that the needed sub-segment is positioned beneath the head, bus contention delays, and other factors.

As is also well know, the amount of delay experienced by each storage device is often not the same. Until all of the sub-segments are available, the controller is typically unable to deliver the desired segment. As a result, the average access time is substantially increased to be approximately equivalent to the average access time of the slowest storage device in the system. The greater the number of storage devices, the greater the average access time.

These delays are highly undesirable in many applications. Indeed, although the speed at which microprocessors and associated RAM can operate is constantly increasing, average access times for hard disk drives have not kept pace. As a consequence, delays in RAID systems are among the most substantial delays in the computing system and, as a result, the most undesirable.

Figure 2:
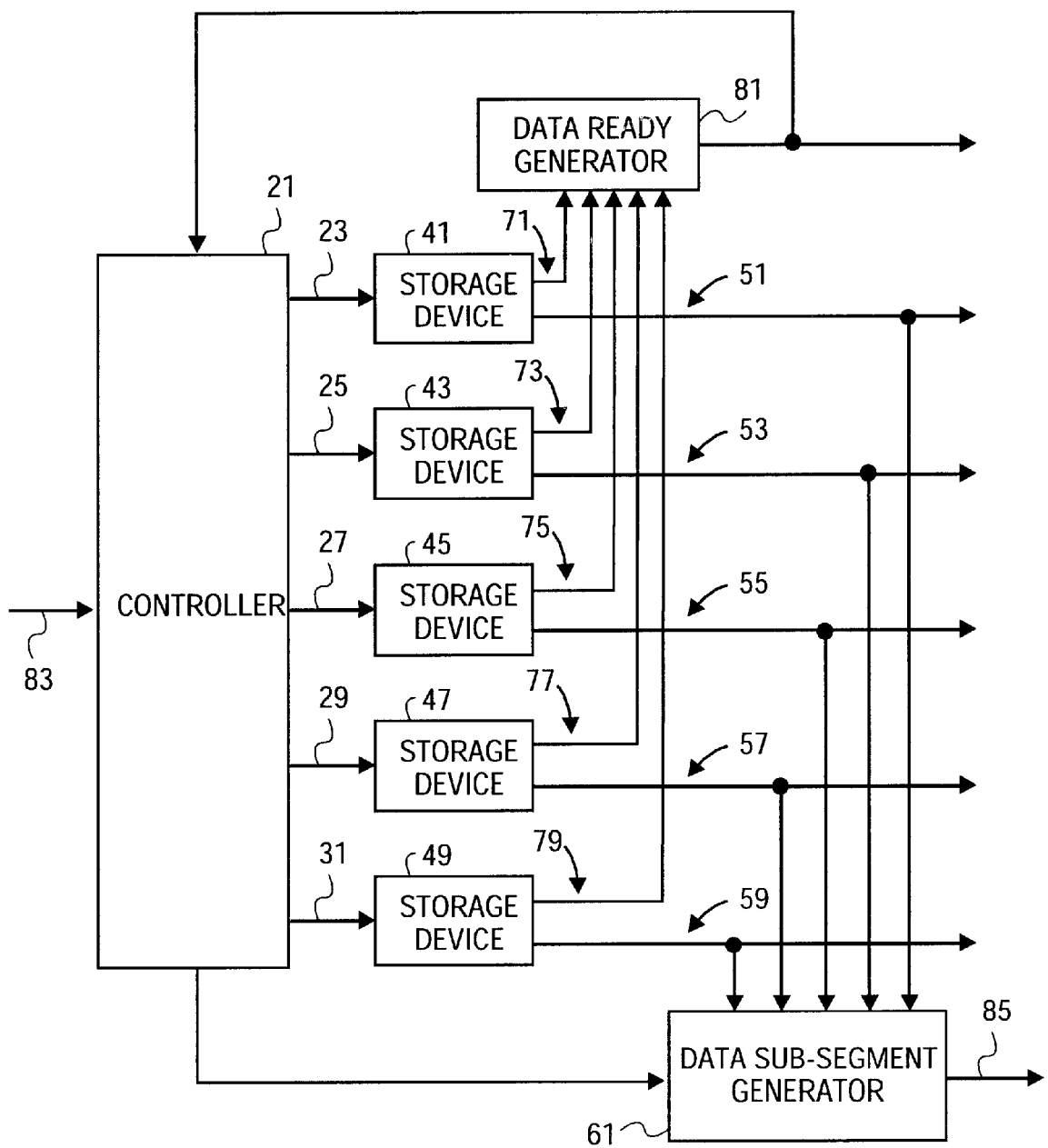
FIG. 2 is a block diagram of one embodiment of the present invention.

FIG. 2 is a block diagram of one embodiment of the present invention which reduces the average delay in a multiple storage device configuration.

As shown in FIG. 2, this embodiment of the invention includes a controller 21 connected to inputs 23, 25, 27, 29 and 31 of storage devices 41, 43, 45, 47 and 49, respectively. Outputs 51, 53, 55, 57 and 59 from the storage devices 41, 43, 45, 47 and 49, respectively, are directed to a data sub-segment generator 61.

Data-ready outputs 71, 73, 75, 77 and 79 from the storage devices 41, 43, 45, 47 and 49, respectively, are directed to a data ready generator 81.

Figure 3:
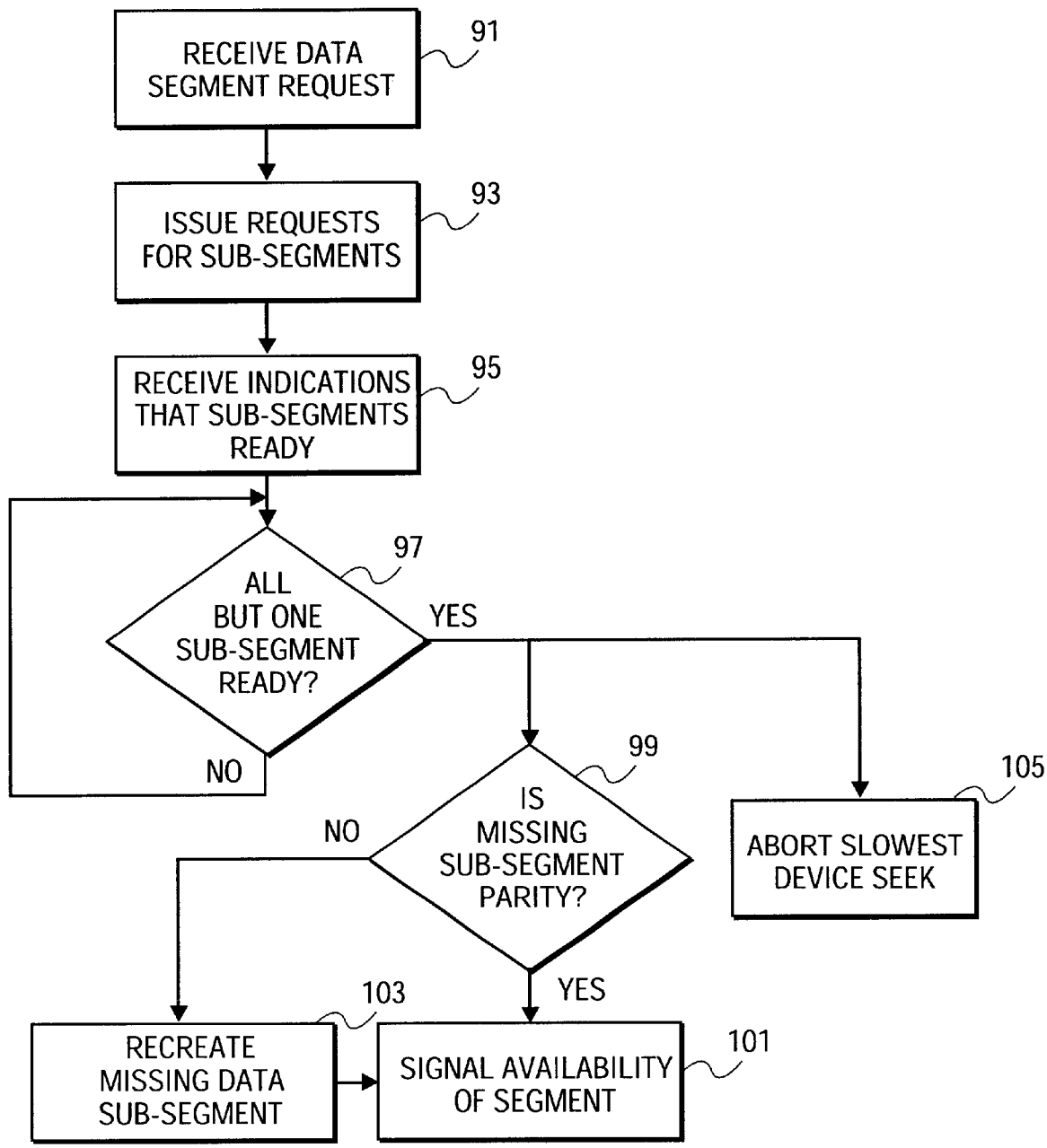
FIG. 3 is a flow diagram of the operation of the embodiment shown in FIG. 2.

FIG. 3 is a flow diagram of the operation of the embodiment shown in FIG. 2. Referring now to both FIGS. 2 and 3, the operation of this embodiment of the invention will now be explained.

A request for a particular segment of user data is delivered over an input 83 to the controller 21. The first step, therefore, is for the controller 21 to receive the data segment request, as illustrated by block 91 in FIG. 3.

The controller 21 then issues the necessary requests for the sub-segments which comprise the needed segment, as illustrated by block 93. These instructions are issued over the inputs 23, 25, 27, 29 and 31 to the storage devices 41, 43, 45, 47 and 49, respectively.

Each of the storage devices then begins to access the needed sub-segment that is stored on it. As soon as the sub-segment is available for delivery at the output of the storage device, the storage device signals. the availability of the sub-segment over the data-ready outputs that are connected to the data ready generator 81. The data ready generator 81, in turn, receives the indications that the sub-segments are ready, as illustrated in block 95 of FIG. 3.

The next step is for the data ready generator 81 to determine when all but one of the sub-segments have indicated as being ready. This step is illustrated in box 97 in FIG. 3. The moment this occurs, a determination is next made concerning the identity of the remaining sub-segment which is not yet ready, as illustrated in block 99 of FIG. 3. If the not-yet ready sub-segment is a parity sub-segment, this means that all of the necessary data sub-segments for the desired segment are ready for delivery to the computer which requested the segment. Such a state of readiness is typically indicated, as reflected by block 101 of FIG. 3.

On the other hand, if the not-yet ready sub-segment is a data sub-segment, this means that the not-yet ready data sub-segment must be recreated using the parity sub; segment and the other data sub-segments which are ready, as reflected in block 103 of FIG. 3. A data sub-segment generator, such as the data sub-segment generator 61, is used to recreate the missing data sub-segment and to deliver it over an output 85 using well-known techniques.

The moment all but the last sub-segment is indicated as being ready, moreover, the controller 21 may also send an abort signal to the slowest storage device, as illustrated by step 105 in FIG. 3. When this added feature is used, the slowest storage device is immediately freed and made available for a future access. In addition, the head on the slowest storage device is not needlessly moved to a location which may be further from the next needed location than its present location.

As should now be obvious to those of ordinary skill in this art, there are a broad variety of approaches to implementing the features that have thus-far been discussed. For example, these features can be implemented in hardware, software, firmware, or a combination of hardware, software and/or firmware. Although the controller 21 is illustrated as controlling all of the various functions, moreover, it is to be understood that these functions could be handled by separate controllers, rather than a single controller. It is also to be understood that many components of the systems may reside in the same or different physical locations.

The invention is also applicable to a broad variety of storage devices, such as hard disk drives, CD-ROMs and tapes. Although the invention can be incorporated in connection with any type of storage device, the benefits of the invention are maximized when used with a group of storage devices that do not necessarily experience the same amount of delay in accessing needed sub-segments.

Although the invention is also applicable to any number of storage devices in a multiple device system, it will be found that the greatest time savings are realized when used in conjunction with a small number of storage devices, rather than a large number of storage devices, such as three.

It should also be understood that the invention contemplates a variety of different topologies for the inputs and outputs to the various components of the invention. In FIG. 2, for example, all of the inputs and outputs are illustrated as being separate. In another embodiment of the invention, a single bus could carry all of these signals in a time-multiplex mode, as is well known in the art.

FIG. 2 also illustrates a separate signal to indicate the availability of sub-segments from each storage device. The invention also contemplates that the mere delivery of sub-segments from the storage device could itself constitute an indication that the sub-segment is available, rather than the separate signal path which is shown in FIG. 2.

Figure 4:
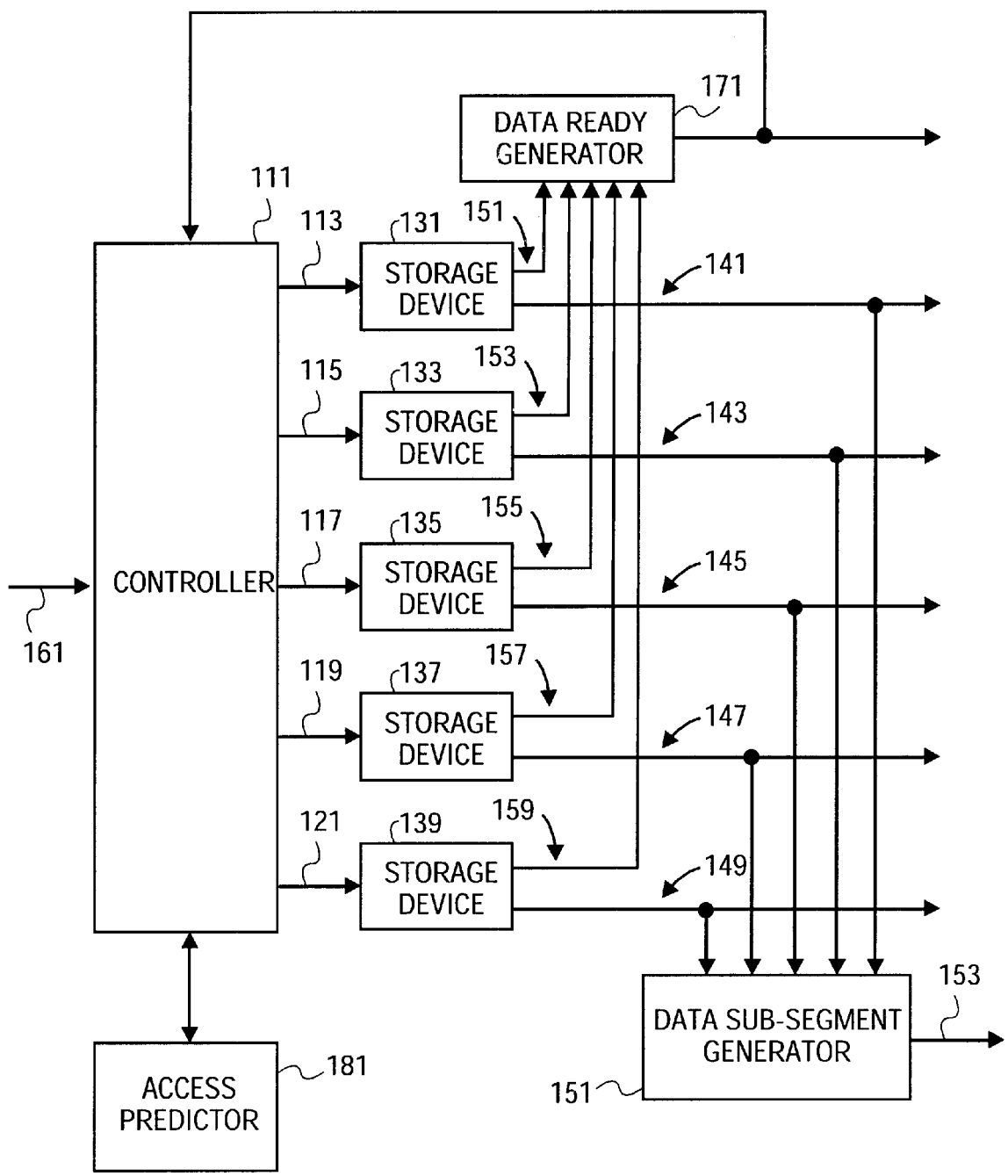
FIG. 4 is a block diagram of another embodiment of the present invention.

FIG. 4 is a block diagram of another embodiment of the present invention. It is similar to FIG. 2 in that it includes a controller 111 connected over input lines 113, 115, 117, 119 and 121 to storage devices 131, 133, 135, 137 and 139, respectively. It is also similar to FIG. 2 in that each of the storage devices 131, 133, 135, 137 and 139 have data outputs 141, 143, 145, 147 and 149 and data-ready outputs 151, 153, 155, 157 and 159, respectively. It is also similar to FIG. 2 in that each of the data-ready outputs are connected to a data sub-segment generator 151 which has an output 153. It is further similar to FIG. 2 in that the controller 111 has an input 161. The system in FIG. 4 also has a data ready generator 171 which operates in a similar manner to the data ready generator 81 in FIG. 2, but not in an identical manner. The embodiment of the invention shown in FIG. 4 also includes an access predictor 181 which is an element that has no parallel in FIG. 2.

Figure 5:
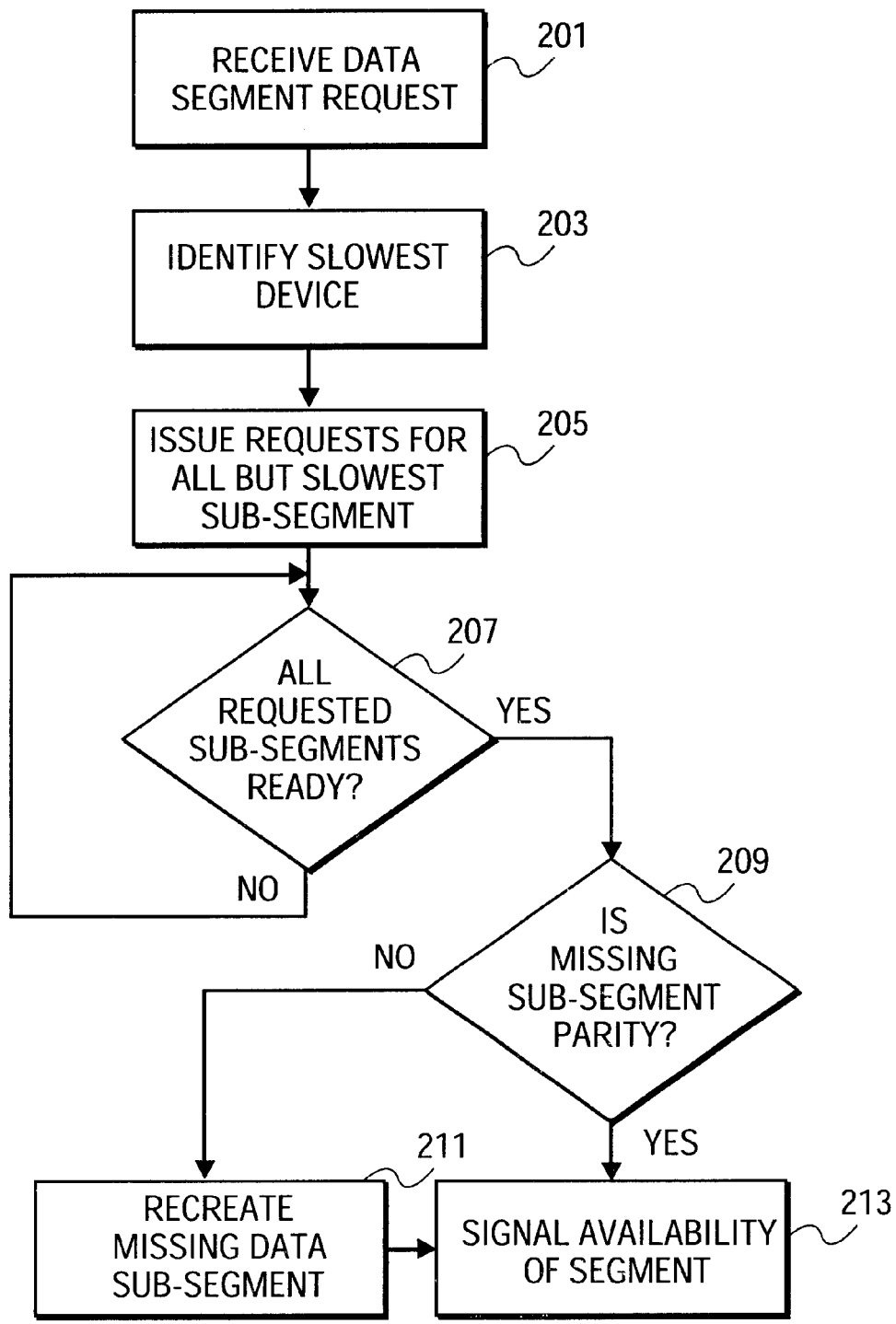
FIG. 5 is a flow diagram of the operation of the embodiment shown in FIG. 4.

FIG. 5 is a flow diagram of the operation of the embodiment of the invention shown in FIG. 4. This operation is best understood by a consideration of FIGS. 4 and 5, and the following explanation.

The process begins by the controller 161 receiving a data segment request, as illustrated in block 201 of FIG. 5. This step is the same as the embodiment shown in. FIGS. 2 and 3.

The next step, however, is different. In FIGS. 2 and 3, the controller 83 signals the storage devices to retrieve all of the needed sub-segments. In the embodiment shown in FIGS. 4 and 5, however, a different course is followed. The access predictor 181 predicts which of the storage devices is likely to take the longest to access the sub-segment which is stored on it. This step is identified in block 203 of FIG. 5. This information is communicated to the controller 111. In turn, the controller 111 issued requests to all but the slowest predicted storage device to retrieve the needed sub-segments, as illustrated in block 205 of FIG. 5. As a consequence of the additional step which is illustrated in block 203 of FIG. 5 and which has just been discussed, i.e., the step of predicting the slowest storage device, the predicted slowest storage device never even receives a request for the sub-segment which is stored on it. On the average, this enhances performance of the overall system even more than the embodiment shown in FIGS. 2 and 3, because the predicted slowest storage device is immediately freed for subsequent accesses, and because its heads never have to move to a location which might be further from the next needed location than their present location.

The remaining operational steps of the system shown in FIGS. 4 and 5 is the same as in FIGS. 2 and 3, and are illustrated in FIG. 5 by blocks 207, 209, 211 and 213. The only difference is the absence of a block- comparable to block 105 in FIG. 3, namely the abort slowest device seek step. Since the slowest predicted drive was never told to access the needed sub-segment in the find instance, there is, of course, no reason to issue an abort signal to it once the other sub-segments have been retrieved.

One other difference between the two embodiments concerns the function of the data ready generator 171. In FIGS. 2 and 3, this component serves to signal the controller when all but one of the sub-segments have been retrieved. In the embodiment shown in FIGS. 4 and 5, however, there is no need for this information, since the system already knows about the identity of the slowest predicted drive.

The invention embraces all techniques for predicting which of the storage devices will be the slowest in connection with each particular access. One technique is for the access predictor to keep track of the location to which each of the storage devices had to go to access the previous sub-segment, to compare that to the location at which each of the storage devices must go to access the current sub-segment, and to identify the storage device which is likely to take the most amount of time to search and retrieve its target sub-segment, based on the differences in the distances that must be traveled. The necessary computations can be entirely performed by the access predictor 181, by the controller 111, and/or can be distributed between the controller 111 and the access predictor 181.

Except for the differences noted above, it should be understood that the embodiment of the invention illustrated in FIGS. 4 and 5 is subject to the same variations as were discussed above in connection with the embodiment of the invention illustrated in FIGS. 2 and 3.

It is also to be understood that the invention could take the form of a broad variety of additional embodiments, and is limited solely by the claims which now follow.

what is claimed is:

1. A data storage system for storing and retrieving user data divided into a plurality segments, each segment containing a portion of the user data and being divided into one or more data sub-segments and a parity sub-segment, the data sub-segments containing the portion of the user data and the parity sub-segment containing information necessary, for recreating an unavailable data sub-segment in conjunction with the available data sub-segments, comprising:

a) a plurality of storage devices for storing the data sub-segments and the parity sub-segment, each storage device:
      i) configured to store one of the sub-segments of each segment;
      ii) having an input for receiving a request for a sub-segment stored on said device; and
      iii) having an output that indicates when a requested sub-segment is available for delivery from said device;
   b) a controller connected to said inputs of said storage devices for causing each of said devices to begin accessing the sub-segment stored on said device that corresponds to a desired segment of the user data in response to a request for that segment; and
   c) a data ready generator connected to said outputs of said storage devices that indicates when all but one of said outputs indicate that the requested sub-segment stored on said device is available for delivery.

2. The data storage system of claim 1 wherein the controller is further configured to issue an abort command following an indication that all but one of said outputs indicate that the requested sub-segment stored on said device is available for delivery to the one storage device that has not yet furnished such an output.

3. The data storage system of claim 1 in which said plurality of storage devices consist of three and only three storage devices.

4. The data storage system of claim 1 in which each of said plurality of storage devices is a hard disk drive.

5. The data storage system of claim 1 wherein the data storage system is configured to store and deliver video streams.

6. The data storage system of claim 1 in which the data storage system is a RAID.

7. The data storage system of claim 1 further including a data sub-segment generator configured to re-generate the sub-segment that is stored in the storage device that has not yet indicated the availability of its sub-segment from the sub-segments, which are available for delivery at that time.

8. A data storage system for storing and retrieving user data divided into a plurality segments, each segment containing a portion of the user data and being, divided into one or more data sub-segments and a parity sub-segment, the data sub-segments containing the portion of the user data and the parity sub-segment containing information necessary for recreating an unavailable data sub-segment in conjunction with the available data sub-segments, comprising:
   a) a plurality of storage devices for storing the data sub-segments and the parity sub-segment, each storage device:
      i) configured to store one of the sub-segments of each segment;
      ii) having an input for receiving a request for a sub-segment stored on said device; and
      iii) having an output that indicates when a requested sub-segment is available for delivery from said device;
   b) an access predictor associated with said plurality of storage devices for predicting which of said storage devices is most likely to take the greatest amount of time to access the sub-segment that is stored on that device that corresponds to a desired segment of the user data in response to a request for that segment, said predictor having an output that identifies the slowest predicted device; and
   c) a controller connected to said inputs and to said access predictor for causing all of said plurality of storage devices, but not the slowest predicted device, to access the sub-segments stored on said devices that correspond to a desired segment of the user data in response to a request for that segment.

9. The data storage system of claim 8 in which said plurality of storage devices consist of three and only three storage devices.

10. The data storage system of claim 8 in which each of said plurality of storage devices is a hard disk drive.

11. The data storage system of claim 8 wherein the data storage system is configured to store and deliver video streams.

12. The data storage system of claim 8 in which the data storage system is a RAID.

13. The data storage system of claim 8 further including a data sub-segment generator configured to re-generate the sub-segment that is stored in the slowest predicted storage device from the sub-segments which are available for delivery at that time.

14. A method for storing and retrieving user data divided into a plurality of segments, each segment containing a portion of the user data and being divided into one or more data sub-segments and a parity sub-segment, the data sub-segments containing the portion of the user data and the parity sub-segment containing information necessary for recreating an unavailable data sub-segment in conjunction with the available data sub-segments, comprising:
   a) storing the data sub-segments and the parity. sub-segment in a plurality of storage devices, with each storage device storing one of the sub-segments of each segment and providing an output that indicates when a requested sub-segment is available for delivery from the device;
   b)y causing each of the devices to begin accessing the sub-segment stored on the device that corresponds to a desired segment of the user data in response to a request for that segment; and
   c) indicating when all but one of the outputs indicate that the requested sub-segment stored on the device is available for delivery.

15. The method of claim 14 wherein the controller issues an abort command following an indication that all but one of the outputs indicate that the requested sub-segment stored on the device is available for delivery to the one storage device that has not yet furnished such an output.

16. The method of claim 14 wherein a data sub-segment generator re-generates the sub-segment that is stored in the storage device that has not yet indicated the availability of its sub-segment from the sub-segments which are available for delivery at that time.

17. A method for storing and retrieving user data divided into a plurality of segments, each segment containing a portion of the user data and being divided into one or more data sub-segments and a parity sub-segment, the data sub-segments containing the portion of the user data and the parity sub-segment containing information necessary for recreating an unavailable data sub-segment in conjunction with the available data sub-segments, comprising:
   a) storing the data sub-segments and the parity sub-segment in a plurality of storage devices, each storage device storing one of the sub-segments of each segment and providing an output that indicates when a requested sub-segment is available for delivery from the device;
   b) predicting which of the storage devices is most likely to take the greatest amount of time to access the sub-segment that is stored on that device that corresponds to a desired segment of the user data in response to a request for that segment, and producing an output that identifies the slowest predicted device; and
   c) causing all of the plurality of storage devices, but not the slowest predicted device, to access the sub-segments stored on the devices that correspond to a, desired segment of the user data in response to a request for that segment.

18. The method of claim 17 wherein the controller issues an abort command following an indication that all but one of said outputs indicate that the requested sub-segment stored on the device is available for delivery to the one storage device that has not yet furnished such an output.

* * * * *